Header omitted 3,719,254
LUBRICATED ANGLE DRIVE ATTACHMENT FOR
AIR OPERATED TOOL
Philip A. Snider, Hicksville, Ohio, assignor to
Dotco, Inc., Hicksville, Ohio
Filed Nov. 10, 1971, Ser. No. 197,237
Int. Cl. F16n 7/18
U.S. Cl. 184—64                 9 Claims

ABSTRACT OF THE DISCLOSURE

An angle drive attachment comprising an angular housing having one leg thereof detachably secured to the end of an air motor housing on whose rotor shaft is mounted a bevel pinion which meshes with a bevel gear keyed onto the output shaft which is journaled in the other leg of said angular housing, said attachment being characterized in that the output shaft is hollow to constitute a lubricant reservoir and has therearound and rotatable therewith a sleeve of absorbent material from which the lubricant is metered in finely divided form by centrifugal force directly onto the teeth of the bevel gear and into the zone of intermesh of the teeth of said bevel pinion and gear thus to lubricate the same. The angular housing of the attachment is provided with a lubricant fitting through which lubricant is periodically supplied into the hollow output shaft.

BACKGROUND OF THE INVENTION

Heretofore, it has been proposed to utilize lubricant-laden air exhausted from the air motor to lubricate the bevel gears of an angle drive attachment but such lubrication has been found to be inadequate in the case of high speed air tools which may, for example, have a rotor speed of 30,000 r.p.m. or more. Such arrangement also requires that the angular housing be provided with openings for air exhaust and hence dirt, dust and other foreign matter may enter the angle attachment housing to cause rapid gear wear. Moreover, when the air supply to the air motor is cut off, the coasting of the rotor shaft to a stop tends to draw in outside air into the angular housing together with any grinding dust etc. which may be in the area surrounding the tool. Another alternative for lubricating the bevel gears of a high speed angle drive attachment is to fill the angular housing with fluid lubricant or with grease but the former expedient entails the provision of a sealed angle housing and the latter expedient entails the problem of inadequate lubrication due to the high speed operation which centrifugally throws the grease off the gear teeth.

SUMMARY OF THE INVENTION

The present invention relates to an angle drive attachment for an air operated tool which enables the use of a fluid lubricant without the need of having a fluid-tight housing and which assures proper gear lubrication for enhancing gear life.

It is another object of this invention to provide a centrifugal lubricating means for the high speed gearing of an angle drive attachment which meters the lubricant in finely divided form right onto the teeth of the gears. The centrifugal metering device also operates as a filter to exclude dirt and foreign matter from reaching the gear teeth even though the lubricant introduced into the attachment may have dirt entrained therewith from the lubricant fitting, for example.

It is another object of this invention to provide an angle drive attachment of the character indicated in which the centrifugal metering device comprises a sleeve of absorbent material which surrounds the output shaft and which rotates therewith and which, as soon as the operation of the tool is commenced after filling of a reservoir in the shaft with liquid lubricant, is saturated with the liquid lubricant so that there is no problem of flow of the lubricant into the attachment housing when the tool is set down after use.

Other objects and advantages of the present invention will appear hereinafter.

DETAILED DESCRIPTION OF THE INVENTION

Figure 1:
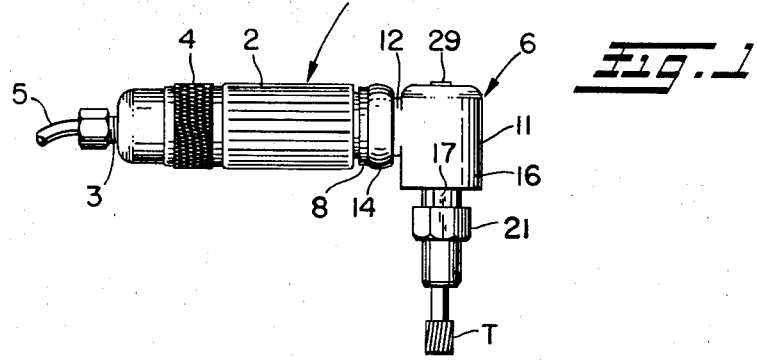
FIG. 1 is a side elevation view showing the angle drive attachment herein attached to one end of the housing of an air motor.

The air operated tool 1 herein shown comprises a tubular hand-held housing 2 within which is disposed a vane type air motor such as disclosed, for example, in Doeden U.S. Pat. 2,830,560, dated Apr. 15, 1958, said housing 2 having an air pressure inlet port 3 at one end and an adjacent air throttling valve 4 which may be lever operated as in said Doeden patent, or which may be in the form of a roll throttle, as disclosed for example, in Doeden U.S. Pat. 3,083,944, dated Apr. 2, 1963. If desired, the tool 1 may be provided with a rear exhaust as disclosed, for example, in Snider U.S. Pat. 3,502,158, dated Mar. 24, 1970, and as known in the art, the air pressure supply line 5 will have therein a lubricator (not shown) which will introduce lubricant into the air stream for lubricating the air motor. By reason of the provision of separate lubrication of the gears of the angle drive attachment 6 herein, the rear exhaust feature may be readily employed since no dependence is made on gear lubrication with lubricant-laden air exhausted from the air motor as has hereinbefore been contemplated.

Figure 2:
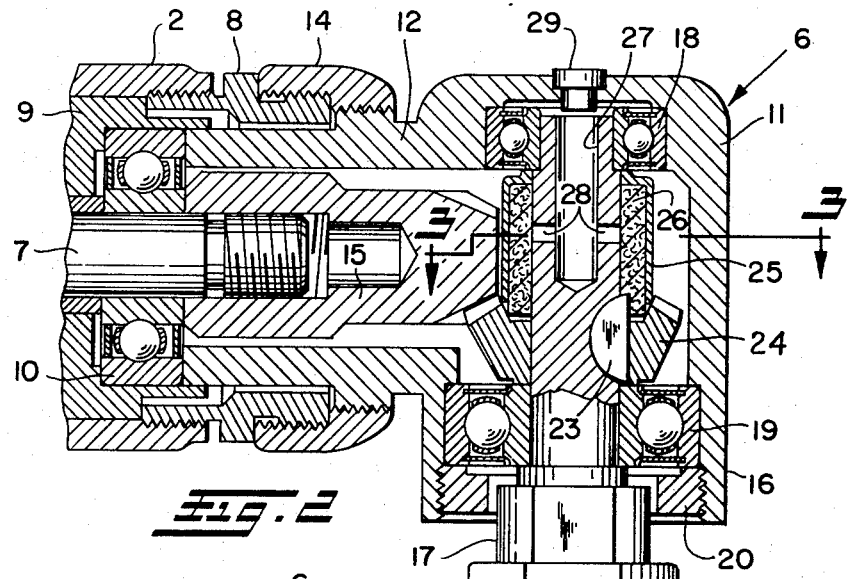
FIG. 2 is an enlarged cross-section view of the angle drive attachment showing the manner in which the same is detachably secured to the end of the air motor housing.

In the air motor constructions shown in the patents referred to there will be provided a stator within the housing 2 having an eccentrically disposed bore in which a vane-carrying rotor is disposed with its shaft 7 coaxially disposed in the housing 2. As best shown in FIG. 2, the housing 2 has screwed thereinto a thimble 8 which serves to clamp the motor end plate 9 against the stator (not shown). Within the end plate 9 is a ball bearing 10 by which the rotor shaft 7 is journaled. As shown in the patents aforesaid, another ball bearing will be provided at the other end of the rotor shaft 7, thus to support the rotor for rotation about an axis coinciding with the axis of the tubular housing 2.

The angle drive attachment 6 herein comprises an angular housing 11, one leg 12 of which is secured to the tool housing 2 by means of the threaded connections of a nut member 14 with said thimble 8 and angular housing 11, the threads being of opposite hand so that the leg 12 may be tightly drawn against the outer race of the bearing 10 without annular overlapping shoulders on the leg 12 and nut member 14. Extending into the leg 12 of the angular housing 11 is a spiral bevel pinion 15 which is screwed onto the end of the rotor shaft 7 and which engages the inner race of the bearing 10.

The other leg 16 of the angular housing 11 has an output shaft 17 which is journaled in said housing 11 by ball bearings 18 and 19 and which is retained in the housing 11 by the screw member 20 which clamps the outer race of the lower ball bearing 19 against a shoulder in the housing 11. The output shaft 17 is provided with a collet chuck 21 or the like for gripping the shank of a tool T therein for rotation about an axis perpendicular to the axis of the rotation of the rotor shaft 7.

The upper ball bearing 18 is of the pre-lubricated type having shields at both its upper and lower ends and the lower ball bearing 19 is of a similar pre-lubricated type having a shield at its upper end and a seal at its bottom end.

Keyed to the output shaft 17 by means of the key 23 is a spiral bevel gear 24 which meshes with the bevel pinion 15. The bevel gear 24 is counterbored as shown with the upper end portion of the key 23 extending upwardly into such counterbore for a purpose which now will become apparent.

Between the upper bearing 18 and the bevel gear 24 and surrounding the output shaft 17 in radially spaced relation is a retainer sleeve 25 which has therein a sleeve 26 preferably of absorbent material such as felt but which may be of porous ceramic or sintered material, the lower end of which extends into the bevel gear 24 counterbore and which is keyed for rotation in unison with the shaft 17 by means of the upper portion of the key 23 which is embedded in the inner lower end portion of the sleeve 26. The lower end of the retainer sleeve 25 is wedged in the counterbore just above the roots of the teeth of gear 24 to form metering orifices for discharge of lubricant. The upper end of the output shaft 17 is provided with a central hole 27 and with radial openings 28 through the wall communicating the hole 27 with the interior of the sleeve 26. The upper end of the housing 11 has therein a grease fitting 29 of conventional form such as one comprising a spring-seated ball which may be unseated by lubricant under pressure from a pressure gun. In this case, the lubricant is preferably a gear lubricant known as "heavy gear oil" which may contain extreme pressure additives. When the tool 1 is to be used, such fluid lubricant is introduced into the reservoir 27 until filled and as soon as the operation of the tool 1 is commenced the lubricant will, by centrifugal force, be caused to flow outward through the passages 28 into the porous sleeve 26, to saturate the latter with lubricant. The high speed operation of the tool 1 and an output shaft 15 speed of, say, 12,000 r.p.m. will cause corresponding high speed rotation of the retainer sleeve 25 and the porous sleeve 26 with the result that the lubricant in the latter will be thrown radially outwardly from the lower end portion thereof which extends below the lower end of the retainer sleeve 25 and into the counterbore in the upper end of the gear 24. Accordingly lubricant in very finely divided form is continuously supplied to the gear teeth to lubricate the same. The porous sleeve 26 also constitutes a filter so that even if dirt or other foreign matter is introduced into the reservoir 27 during the filling operation, such dirt or foreign matter will not pass through the porous sleeve 26 and hence will not reach the gear teeth to cause excessive wear thereof.

It has been found that in prior tools without lubrication as herein contemplated nearly sixty percent of the tools which are returned for servicing have bevel gears which are worn to the point of requiring replacement while air motor wear has been negligible in such returned tools. The present invention assures greatly enhanced gear life and it has been found that filling of the oil reservoir 27 once during each work shift is entirely adequate. Of course, the size and density of the porous sleeve 26 may be varied to vary the oil capacity thereof and the rate of metering of lubricant therefrom correlated to speed of operation of the tool.

In summary, it can be seen that in the present angle drive attachment 6 lubricant is supplied right at the gear mesh area where it is most needed and hence in high speed gearing there is no problem in keeping the lubricant in the mesh area because this is where the lubricant is centrifugally supplied in metered amount. Herein the liquid lubricant is continuously metered to the inside of the gear teeth. Moreover, the present invention permits the use of oil as the lubricant is distinguished from grease without sealing problems which would be encountered if the angle housing 11 were filled with oil. Because the porous sleeve 26 herein constitutes a metering device to gradually feed the lubricant, the lubricant lasts longer than if oil were simply applied on the gear teeth. The present invention also allows the angle housing 11 to be sealed sufficiently to keep out dirt as distinguished from prior designs wherein oil mist lubrication is depended upon since in that case the angle housing must have openings for air exhaust which would permit entry of dirt into the gear area especially when the tool is shut off and the air motor tends to draw in outside air and dirt through the openings in the angle housing. As already mentioned, the porous metering device serves as a filter so that even if the lubricant has dirt entrained therein when it is introduced into the reservoir 27, this dirt accumulation in the reservoir cannot reach the gear teeth by reason of the filtering action of the porous sleeve 26.

Figure 3:
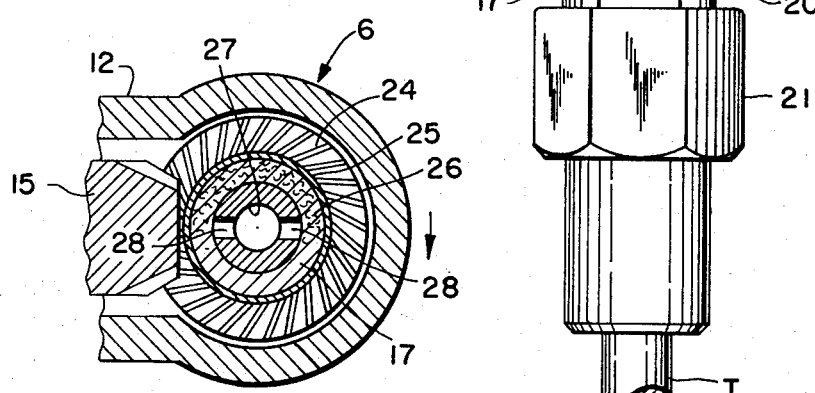
FIG. 3 is a cross-section view along line 3—3, FIG. 2.

When the gear 24 rotates in the direction of the arrow in FIG. 3, the spiral teeth thereof are believed to impart an upward pumping effect on the finely divided lubricant further to enhance the lubrication of the gear teeth. It is also noted that lubricant is thrown out all the way around including the zone whereat the teeth are approaching and are in full intermeshing engagement.

I, therefore, particularly point out and distinctly claim as my invention:

1. An angle drive attachment for an air operated tool of the type having a motor housing with a drive shaft at one end terminating in a bevel pinion; said attachment comprising an angular housing having means on one leg thereof for securing said angular housing to such one end of said motor housing; an output shaft journaled in the other leg of said angular housing and having a bevel gear thereon which meshes with said bevel pinion when said angular housing is secured to said motor housing; an absorbent sleeve containing liquid lubricant therein disposed around and rotatable with said output shaft and having an end portion extending within the teeth of said bevel gear; a retainer sleeve around said absorbent sleeve leaving such end portion of said absorbent sleeve peripherally exposed whereby, during rotation of said output shaft, lubricant is centrifugally thrown out from said end portion of said absorbent sleeve in finely divided form to lubricate the teeth of said bevel pinion and said bevel gear including the zone whereat the teeth are in intermeshing relationship and are approaching such intermeshing relationship.

2. The angle drive attachment of claim 1 wherein said end portion of said absorbent sleeve extends into a counterbore in said bevel gear; and wherein key means for keying said bevel gear to said output shaft extends into such counterbore and is embedded in such one end portion of said absorbent sleeve to effect rotation of said absorbent sleeve in unison with said output shaft.

3. The angle drive attachment of claim 1 wherein said output shaft has tool mounting means at one end and a central opening in the other end with a passage through the wall thereof communicating with the interior of said absorbent sleeve; said central opening constituting a reservoir which is adapted to be periodically filled with lubricant when the tool is not in use, such lubricant being caused by centrifugal force to flow through such passage to saturate said absorbent sleeve with lubricant upon commencement of rotation of said output shaft.

4. The angle drive attachment of claim 3 wherein said angular housing has a lubricant fitting adjacent such other end of said output shaft through which lubricant is introduced into said center hole.

5. The angle drive attachment of claim 1 wherein said absorbent sleeve is of felt-like material snugly fitting around said output shaft and within said retainer sleeve; said absorbent sleeve, during rotation of said output shaft, being operative to meter the lubricant centrifugally thrown from said end portion thereof in finely divided form and further constituting a filter to retain contaminants which may be present in the lubricant.

6. The angle drive attachment of claim 4 wherein said absorbent sleeve is of felt-like material to constitute a filter to prevent passage therethrough of any contaminants in the lubricant when introduced into said central opening through said fitting.

7. The angle drive attachment of claim 1 wherein said retainer sleeve extends into a counterbore in said bevel gear in close proximity to the radially inner ends of the teeth thereof and just above the roots of said teeth thus to form orifices through which the lubricant is metered.

8. The angle drive attachment of claim 1 wherein such end portion of said absorbent sleeve extends into a counterbore in said bevel gear; and wherein key means for keying said bevel gear to said output shaft extends into such counterbore and is keyed in such one end portion of said absorbent sleeve to effect rotation of said absorbent sleeve in unison with said output shaft.

9. The angle drive attachment of claim 8 wherein said retainer sleeve has an end portion wedged in such counterbore to engage the radially inner ends of the teeth of said bevel gear to define orifices with the roots of said teeth through which the lubricant is metered.

References Cited

UNITED STATES PATENTS

| | | | |
|---|---|---|---|
| 1,274,433 | 8/1918 | Mix | 184—64 X |
| 3,146,856 | 9/1964 | Enders | 184—102 |
| 3,162,268 | 12/1964 | Short | 184—102 X |
| 2,929,468 | 3/1960 | Steiner | 184—6.12 |
| 1,979,007 | 10/1934 | Morton | 74—468 |
| 3,119,456 | 1/1964 | Burnett | 74—467 X |
| 2,883,880 | 4/1959 | Merkle | 184—6.12 X |
| 1,924,946 | 8/1933 | Kott | 173—140 X |

MANUEL A. ANTONAKAS, Primary Examiner

U.S. Cl. X.R.

74—468; 173—163; 184—102; 415—503